United States Patent [19]
Gupta et al.

[11] Patent Number: 5,394,145
[45] Date of Patent: Feb. 28, 1995

[54] PERFORMANCE MONITORING FOR LOOPS

[75] Inventors: Dev V. Gupta, Flemington; Kyung-Yeop Hong, Belle Mead, both of N.J.

[73] Assignee: Integrated Network Corporation, Bridgewater, N.J.

[21] Appl. No.: 29,876

[22] Filed: Mar. 11, 1993

[51] Int. Cl.⁶ ............................................. H03M 5/12
[52] U.S. Cl. .................................................. 341/73
[58] Field of Search .................... 341/73, 74, 51, 56, 341/94; 375/17, 18, 19, 20

[56] References Cited

U.S. PATENT DOCUMENTS 4,472,813  9/1984  Koike et al. .................... 375/18

OTHER PUBLICATIONS

Bell Communications Research, "Generic Requirements for the Digital Data System (DDS) Network Office Channel Unit", Technical Advisory, TA-TSY-000083, Issue 2, (Apr., 1986).

Bell Communications Research, "Digital Data System (DDS) Multipoint Junction Unit (MJU) Requirements", Technical Advisory, TA-TSY-000192, Issue 2, (Apr., 1986).

"Carrier-to-Customer Installation DS1 Metallic Interface", *American National Standard for Telecommunications*, (New York) ANSI T1.403-1989.

Chernak, J. and Lang, J. J., "D4 Digital Channel Bank Family: Overview", *The Bell System Technical Journal*, 61:9 2607-2845 (Nov., 1982).

Snow, N. E. and Knapp, J., Jr., "Digital Data System: System Overview", *The Bell System Technical Journal*, 54:5 (May-Jun., 1975).

Bell Communications Research, "Generic Requirements for the Subrate Multiplexer", Technical Advisory, TA-TSY-000189, Issue 1, (Apr., 1986).

*Primary Examiner*—Brian K. Young
*Attorney, Agent, or Firm*—Hamilton, Brook, Smith & Reynolds

[57] ABSTRACT

Loop Performance Monitoring (LPM) for DDS loops is described. Even though DDS loops have Intentional Bipolar Violations (BPVs), a Loop Coding Violations (LCVs) detection strategy based on further processing of BPVs is described. By monitoring LCVs a local loop terminating device can determine Bit Error Rate (BER).

A system is described by which an Office Channel Unit (OCU) can process LCV information to determine signal quality of the signal over the incoming local loop. If the signal quality falls below a certain threshold, the OCU can cut the loop off from the DDS circuit and send control codes into the network.

A system is also described where a Network Interface Unit (NIU) with the LPM system communicates incoming LCV information to the OCU using low speed signalling over the simplex path between the transmit and receive pairs. The OCU monitors incoming LCVs as well, and thus has the information necessary to determine bi-directional BER performance.

20 Claims, 9 Drawing Sheets

BPV DETECTION CIRCUIT
14

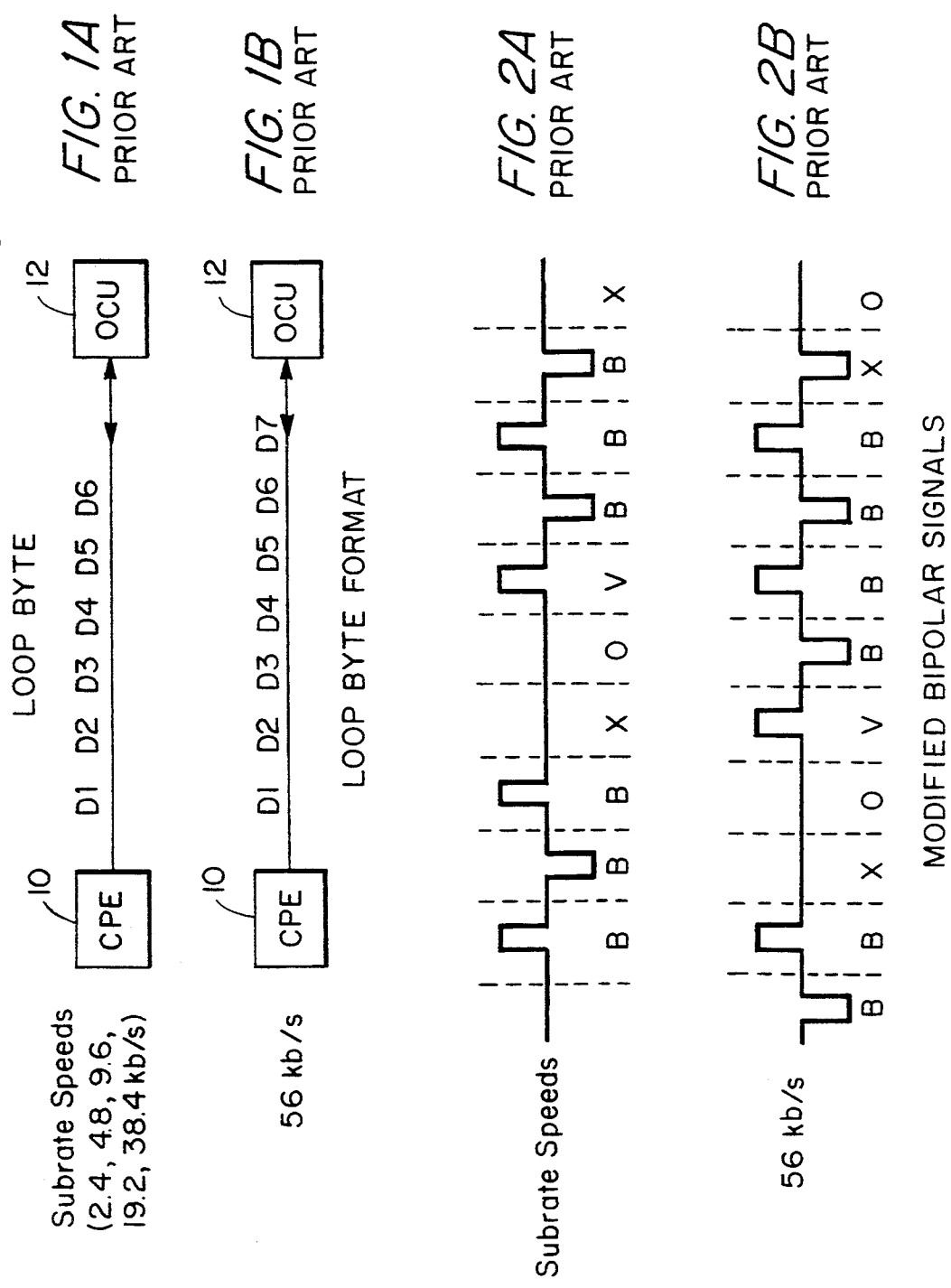

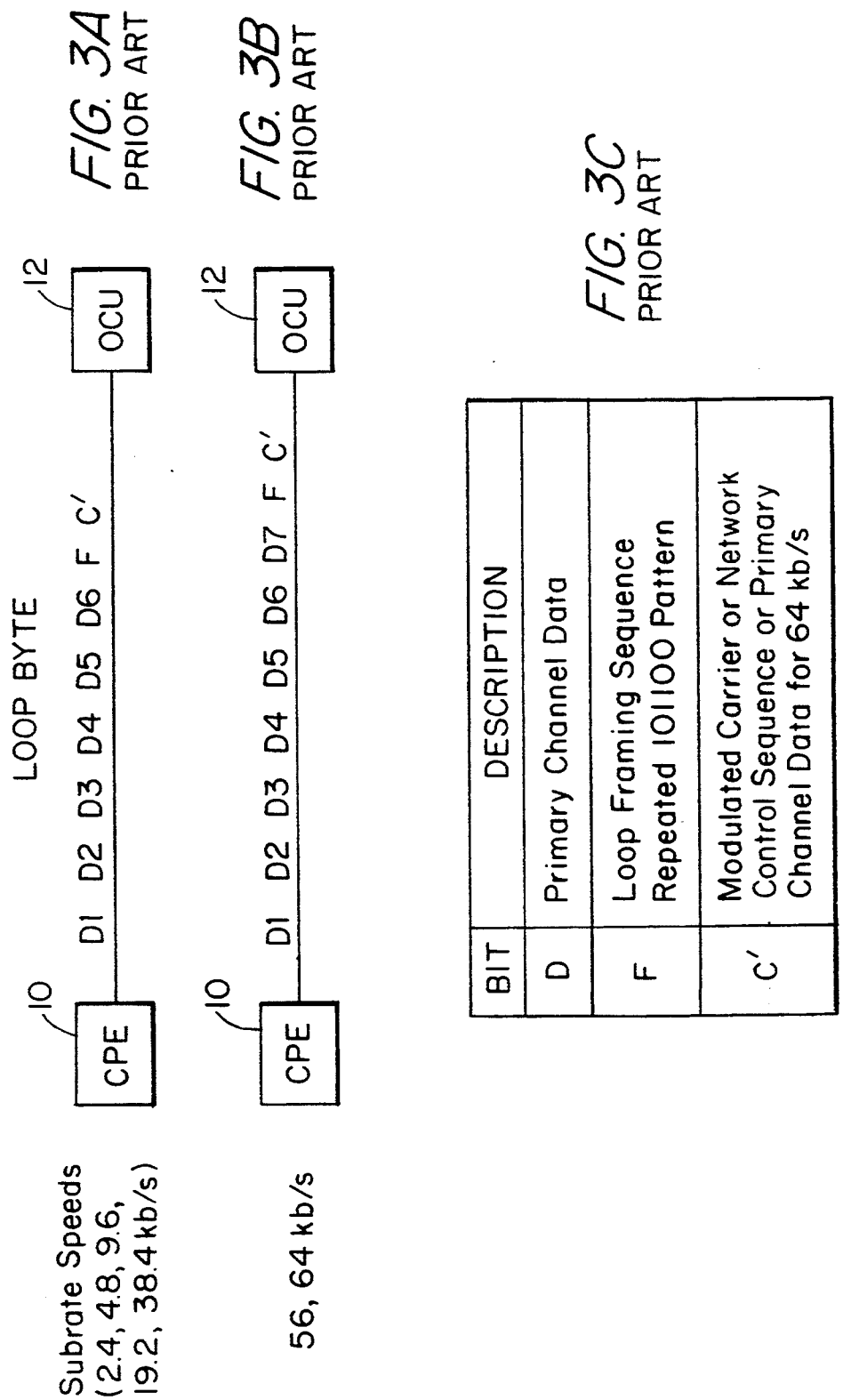

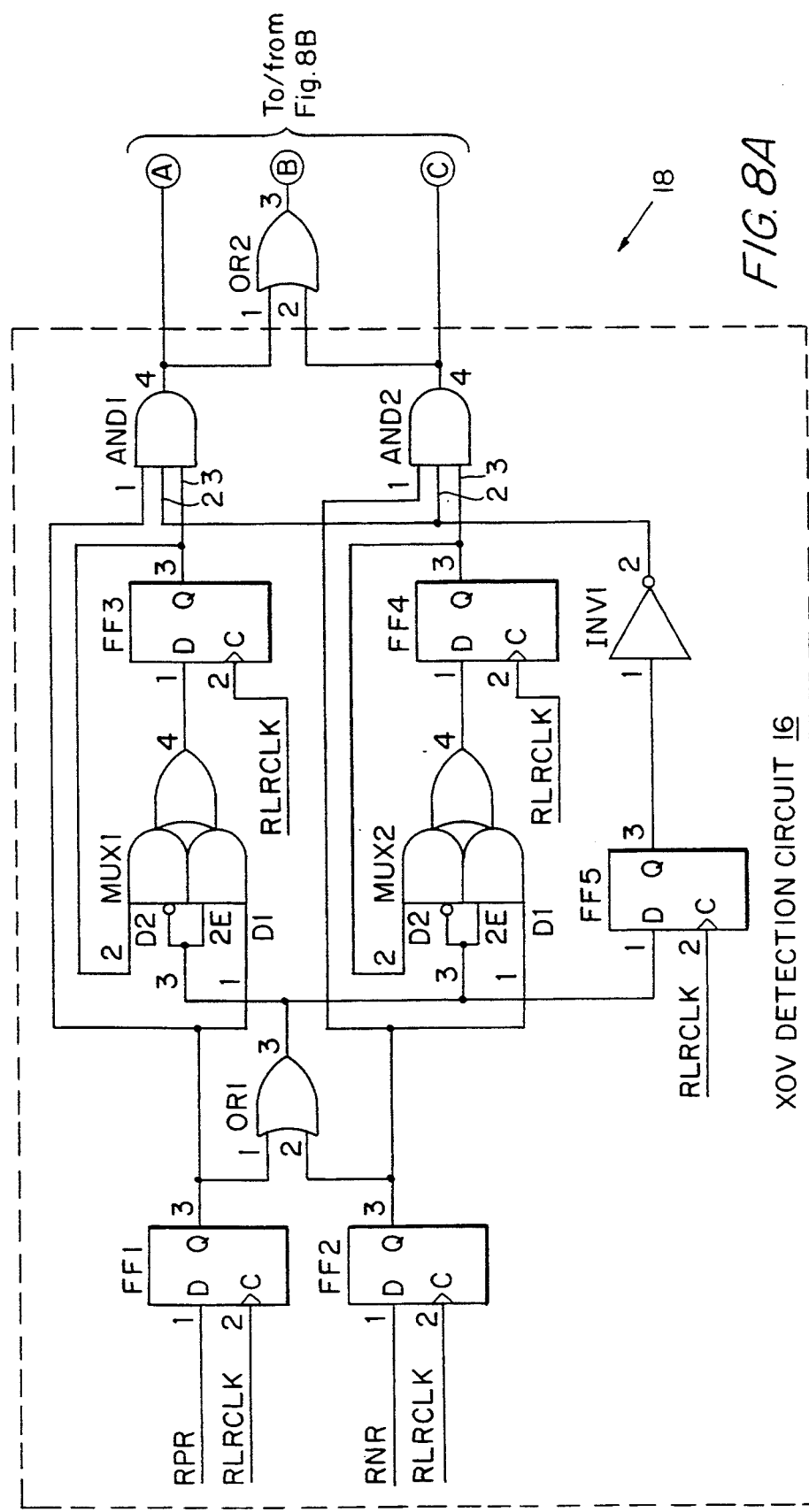

PERFORMANCE MONITORING FOR LOOPS

BACKGROUND OF THE INVENTION

DDS Loop Technology and Coding Format

Dataphone Digital Service (DDS) is a private line digital data point-to-point, or point-to-multipoint communication service, widely deployed in the United States of America and is described in detail in the following references (incorporated herein by reference):

1, "D4 Digital Channel Bank Family", Bell System Technical Journal, Vol. 61, Number 9, Part 3, November 1982.

2. "Digital Data System", Bell System Technical Journal, Vol. 54, Number 5, May—June 1975.

3. "Generic Requirements for the Subrate Multiplexer", Issue 1 TA-TSY-000189, Bell Communications Research Inc., April 1986.

The data rate at which a DDS customer can obtain service are the subrates 2.4 kbps, 4.8 kbps, 9.6 kbps, 19.2 kbps, 38.4 kbps and the full rates 56 kbps, 64 kbps. The local distribution of a DDS connection uses metallic, twisted-pair cables for the full-duplex four-wire transmission path between the customer premises and the serving DDS office. A Channel Service Unit (CSU) serves to terminate the four-wire loop at the customer premises. At the DDS serving office the loop is terminated with an Office Channel Unit (OCU). The OCU encodes the incoming data signals into an 8-bit byte format that adds necessary control information and, regardless of the data service rate, builds the signal up to a rate of 64 kbps.

The DDS local loop signalling format employs Alternate Mark Inversion (AMI) encoding to convert digital data signals generated at the customer premises to an AMI line code format. In AMI, a ONE bit is transmitted as a pulse transition (polarity change) and a ZERO bit as no pulse. The digital signal on the local loop is baseband, bipolar, return-to-zero, with 50-percent duty cycle. This signal has a symbol rate equal to the data rate. A binary 1 is transmitted as a positive or negative pulse, in opposite polarity to the preceding pulse. A binary 0 is represented by the absence of a pulse. The local loop signal format is described in detail in the following reference (incorporated herein by reference):

4. "Digital Data System Requirements for the Office Channel Unit", Issue 1, TA-TSY-000083, Bell Communications Research Inc., December 1984.

As shown in FIGS. 1a and 1b, the loop signal between the CPE 10 and the OCU 12 (with non-secondary channel information) is formatted in 6 bit bytes containing six channel data bits D1–D6 for the data rates of 2.4, 4.8, 9.6, 19.2 and 38.4 kpbs (FIG. 1a), or 7 bit bytes containing seven channel data bits D1–D7 for 56 kbps (FIG. 1b). The presence of network control information is indicated by modifying the standard bipolar signal. The signal is modified by inserting a violation 'V' pulse into the bit stream. This pulse has the same polarity as the immediately preceding pulse (hereinafter "the "previous" pulse), thus violating the standard format.

Unrestricted insertion of violations would produce an undesirable dc component on the local loop. Therefore, a bit period is reserved two bits prior to a violation, for insertion of a bipolar pulse or no pulse, i.e., a zero, in such a manner that successive violations alternate in polarity. Calling this inserted pulse an 'X' bit; modified bipolar signals are shown in FIGS. 2a and 2b with X bit values of 0 and 1. If the number of pulses since the previous violation is odd, the X bit is a zero. If the number of pulses since the last violation is even, a pulse of opposite polarity to the previous pulse is inserted into the pulse stream as the X bit. The complete violation sequence includes a forced zero between the X and V bits; therefore, the sequence is called an XOV sequence.

A secondary channel capability has been proposed to offer a companion digital transmission channel independent of the primary channel and at a lower rate. Secondary channel capability requires that the loop signal be structured so that the primary and secondary channel information can be differentiated. As shown in FIGS. 3a and 3b, the loop signal with secondary channel information is formatted in 8 bit bytes containing six primary channel data (D) bits D1–D6 for the primary channel rates of 2.4, 4.8, 9.6, 19.2 and 38.4 kbps (FIG. 3a), or 9 bit bytes containing 7 D bits for 56 kbps primary channel data, or 9 bit bytes containing 8 D bits for 64 kbps primary channel data (FIG. 3b). Each byte contains an "F" bit for framing, and a "C" bit arising out of the substitution of the secondary channel information on no more than one out of every three C bits (FIG. 3c). Intentional Bipolar Violations (BPV) in the loop signal with secondary channel information are not required. BPVs are used in the basic DDS service to transmit control and supervisory information.

MJU Circuits and Streaming Branches

The DDS provides full duplex, synchronous, end-to-end digital transmission on dedicated private line two point and multipoint circuits. A two point circuit connects two customer stations. A multipoint circuit allows several customer stations to share a common communication channel using Multipoint Junction Units (MJU) located in DDS offices. The customers control station broadcasts downstream to one or more remote stations. In the upstream direction the MJUs combine the bit streams transmitted by the remote stations into a serial bit stream for delivery to the control station. The DDS multipoint service serves only those multipoint circuits that have a single customer-control location and a number of remote stations. The duplex data path from the MJU to the customer's control station (upstream direction) is called the control channel while the duplex data paths from an MJU toward the remote stations (downstream direction) are called branches. It is the responsibility of the data customer to use an appropriate "polling technique" so that only one remote station is transmitting data toward the control station at any given time.

In the upstream direction, the MJU receives a steady stream of the Control Mode Idle (CMI) code (S1111110) or Data Mode Idle (DMI) code (S1111111) when the customer is not transmitting data on a branch. When a remote station becomes active, the idle condition will change to a data pattern provided by the customer. Functionally, the MJU can "AND" the data bits and "OR" the control bits from the branches. Note that if more than one branch is carrying an active data signal, the control channel output will be the garbled combination of the branch input signals. Since many control conditions can be signaled upstream, all network control codes (bit 8=0) received on any branch are treated as if they were the same as CMI/DMI for purposes of forming the upstream transmission byte. The MJU operation is described in detail in the following reference (incorporated herein by reference):

5. "Digital Data System—Multipoint Junction Unit Requirements", Issue 2, TA-TSY-000192, Bell Communications Research Inc., April 1986.

On a multipoint circuit, one or more idle noisy station loops (or branches), which are experiencing errors (called streaming branches), interfere with a customer's active branch. In other words, streaming branches could cause total multipoint network failures. Thus, the overall reliability of multipoint circuits worsens as the number of branches increases.

A need exits, therefore, for a system for automatically identifying noisy branches and disconnecting them from the multipoint circuit.

Proactive Maintenance

DDS is designed to be a high performance service. A typical DDS circuit terminates at the OCU at the End Office and is cross connected to T-carrier facilities for inter-office or inter-LATA haul. T-carrier uses an AMI line format and error performance of these T-carrier facilities has traditionally been monitored using BPVs. As the error performance of these facilities begins to degrade, preventive maintenance is triggered, often before the resulting performance is unacceptable given DDS performance requirements. If enough DDS circuits are present in the carrier, automatic protection switching is employed on the facility.

Unfortunately, DDS local loops are the most vulnerable part of the circuit. Since, for many of the DDS rates, BPVs are deliberately employed to transport control conditions over the local loop, heretofore it has not been possible to employ similar techniques as T-carrier for these loops.

Service capability, equivalent to DDS, multiplexed with other services (like voice frequency (VF) services) can be provided using T1 facilities directly to the customer's premises, or by local bypass service providers (principally Inter Exchange Carriers (IXCs)). This, of course, results in revenue loss for the telephone company, loss of account control, and does nothing to solve the problem for the small service sites where there are no other service needs to multiplex with the data communication needs. To further differentiate their service, IXC's employ an ESF format over the access T-carrier facility. In ESF format, part of the framing bit bandwidth carries Cyclic Redundancy Check (CRC) information which allows measurement of Bit Error Rate (BER). In the framing bit bandwidth, ESF also carries a full duplex Facilities Data Link (FDL) which, amongst other information, is used to relay back incoming BER information on the outgoing carrier facility at the customer's premise. Thus, bi-directional performance information is available at the central office to trigger an appropriate proactive maintenance strategy. The ESF framing format is described in detail in the following reference (incorporated herein by reference):

6. "Carrier to Customer Installation—DS1 Metallic Interface" ANSI T1, 403-1989.

A need exists, therefore, for an equivalent proactive maintenance system for DDS local loops.

SUMMARY OF THE INVENTION

An apparatus and method is provided for automatically detecting BPV's occurring in a two-wire local loop digital AMI encoded baseband bipolar return-to-zero signals transmitted as two trains of pulses Receive Positive Rail (RPR) pulses and Receive Negative Rail (RNR) pulses on a respective rail (wire) of the local loop. The signals on each rail are synchronized. Present RPR pulses are AND'ed in an AND gate with previous RPR pulses. A BPV is detected when both the present and previous RPR pulses are positive. The previous RPR pulse is stored when a number of zeros occur between two positive RPR pulses and the previous positive pulse is eventually AND'ed with the present positive pulse to detect a BPV. If the present pulse on the positive rail is negative the previous positive pulse is no longer stored. Instead, a zero level pulse is coupled to the AND gate to be AND'ed with the present pulse (which is negative) in which case the output of the AND gate will be a zero and no BPV will be indicated.

The signals on the Receive Negative Rail are processed in a similar fashion in a negative BPV circuit and the output of the AND gate of the negative BPV circuit is OR'ed with the output of the AND gate of the positive BPV circuit to produce an automatic indication of a BPV occurrence on either rail.

An apparatus and method is also provided for detecting XOV's by determining the occurrence of a BPV having the same polarity as the last BPV. In this system the present positive pulse and the previous positive pulse on the positive rail are AND'ed with a pulse that only becomes high when the previous pulse on the positive rail is a zero level pulse. A positive XOV is detected when the present positive pulse is a BPV and the previous pulse is a zero level pulse. Consecutive zero level pulses between two positive pulses are ignored as before by holding the previous positive pulse in storage. Negative XOV's are detected in a similar fashion.

In addition an apparatus and method is provided for preventing noisy branch stations, which are causing errors, and thus possibly interfering with a customer's active branch. This is accomplished by monitoring the data received from the loop for streaming errors, i.e., unintentional BPV's. When a streaming error is detected an Abnormal Status Code (ASC) comprising a bit data byte of S0011110. In accordance with standard DDS multipoint bridging rules the ASC code coming in on a branch signals or tells the multipoint bridge to not include that branch on the bridge.

An equivalent proactive maintenance technique for DDS local loops is provided which uses a Network Interface Unit (NIU) bridged on to the local loop at the customers premise to monitor the incoming loop for loop code violation (LCVs). The NIU signals back the presence of LCVs to the OCU at the Central Office by creating a slow speed data link on the simplex path between the incoming and the outgoing local loop. The OCU can thus collect bi-directional performance information and provide it to a proactive maintenance application instrumented by the telephone company.

BRIEF DESCRIPTION OF THE DRAWINGS

FIG. 1a is a schematic representation of the loop byte format for loop signalling between OCU's and CPE's at subrate speeds.

FIG. 1b is a schematic as in FIG. 1a for 56 Kb/s signally.

FIG. 2a is plot of amplitude versus time o one byte of the subrate speed data signal in which network control information is indicated by modifying the standard bipolar signal.

FIG. 2b is a plot as in FIG. 2a for the 56 Kb/s signal.

FIG. 3a is a schematic representation of the loop byte format for subrate speeds loop signalling which includes a secondary channel capability.

FIG. 3b is a schematic as in FIG. 3a for 56 Kb/s signalling.

FIG. 3c is a table explaining the bit format of FIGS. 3a and 3b.

FIG. 8A and 8B are a schematic diagram of a non-alternating XOV detection circuit.

DETAILED DESCRIPTION OF THE INVENTION

Monitoring Loop Errors Through Loop Coding Violations (LCVs)

The reliability problems associated with multipoint circuits described above can be solved if a mechanism can be provided to automatically identify noisy branches and cutting them off from the multipoint circuit. Since, for many DDS rates, BPVs are intentionally present on a DDS loop, BPVs alone are not an adequate measurement of loop performance. The following is a detailed description of a system for determining the occurrence of LCVs. The frequency of occurrence of LCV's is a measure of DDS loop performance. An OCU is also described that upon determining that the terminated loop is noisy by the frequency of occurrence of LCV's, transmits network control codes upstream into the multipoint circuit. This feature allows the service provider to deliver the same reliability performance on multipoint circuits as private line circuits.

Monitoring for LCV's in Secondary Channel and Clear—64kbps rates

The Secondary Channel (SC) capability in the DDS network offers a companion lower bit rate digital transmission channel that is essentially independent of the primary DDS channel. It is implemented by time-sharing the network control bit (bit 8) position with the customer as discussed below. As previously described in connection with FIGS. 3a, b, c; customer's data stream on the loop is formatted in 8 bit bytes containing 6 primary channel rates of 2.4, 4.8, 9.6, 19.2 and 38.4 kbps, and 9 bit bytes containing 8 D bits and 1 F bit for clear—64 kbps channel data. In SC loop format, network control and supervisory information is encoded into C′ bit so that intentional BPVs are not necessary. In clear—64 kbps loop format, network control and supervisory information is transmitted using a number of data sequences, not using the C′ bit, so that intentional BPV is not necessary. Therefore, any signal BPV on the local loop can be interpreted as an error event. Thus, for these rates, LCVs and BPVs are the same.

Figure 4:
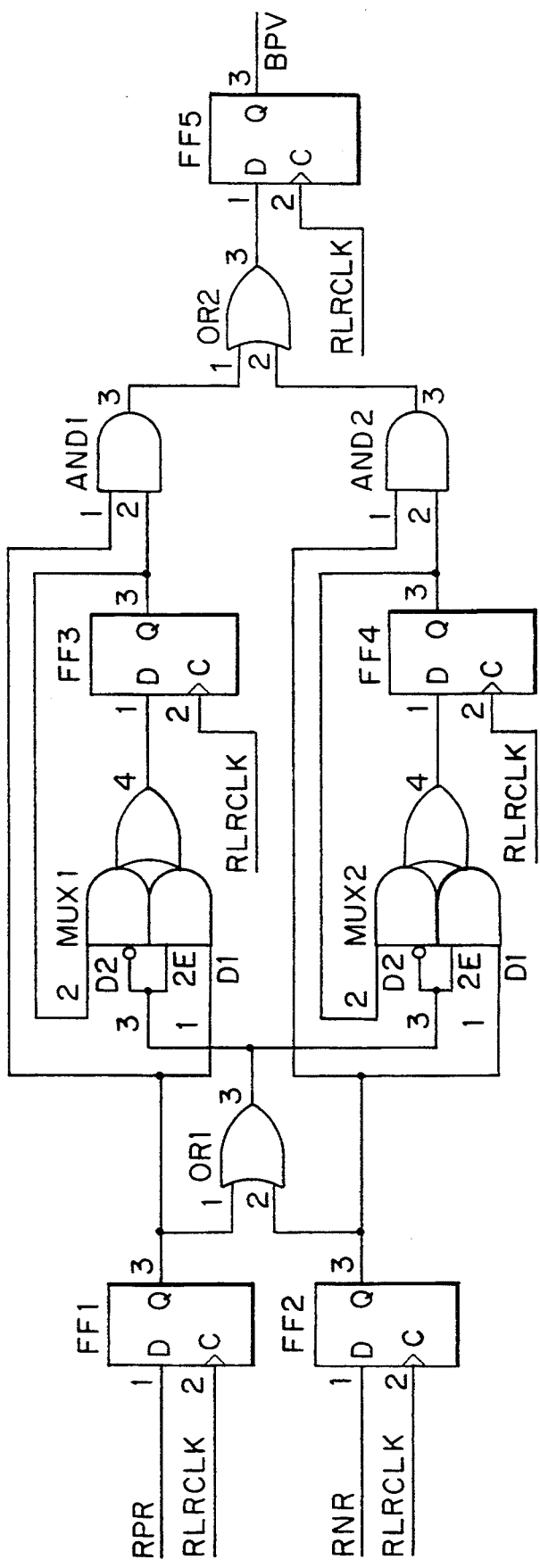
FIG. 4 is a schematic diagram of a BPV detection circuit.
Figure 5:
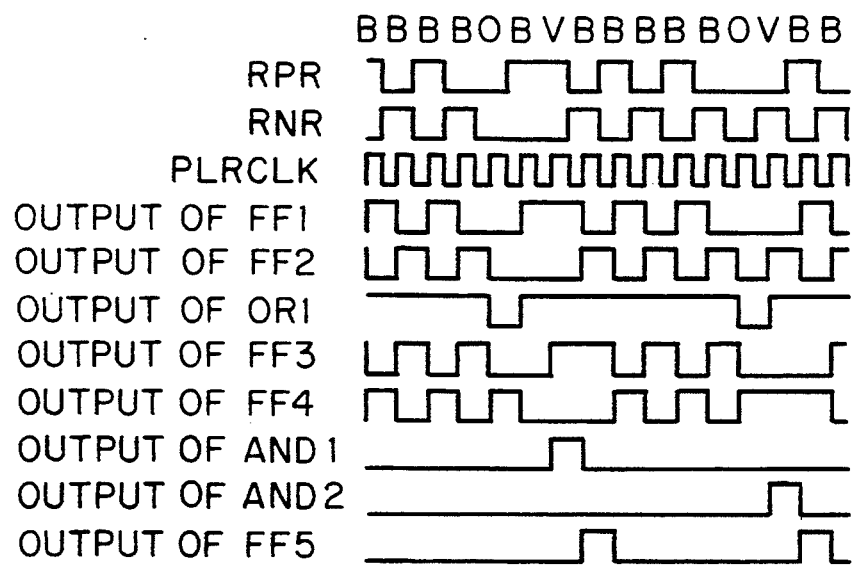
FIG. 5 is a timing diagram illustrating the details of each of the signals in FIG. 4.

A BPV detection circuit in accordance with the invention will now be described, in detail, in connection with FIG. 4. As shown in FIG. 4, the Receive Positive Rail (RPR) pulses and the Receive Negative Rail (RNR) pulses are the identical inverse of one another and are separately coupled to respective flip-flop circuits FF1 and FF2 where the two rails are retimed by Receive Loop Rate Clock pulses (RLRCLK) from a source (not shown) of clock pulses. The Q Output of FF1 is the present positive rail pulse and the Q output of FF3 is the previous positive rail pulse train, i.e., the previous pulse train which has been stored and delayed by one clock pulse period. These two positive rail pulses are coupled to an AND gate AND1. The output of AND1 goes positive only when two positive pulses are simultaneously present at its two input terminals. Positive rail BPV is detected by the positive pulse from AND1 when both of the present and previous positive rail pulses are positive at the same time. The multiplexer MUX1 holds the previous positive rail pulse until the next pulse shows up. So, in the case of a number of zeros between two positive pulses, the MUX1 will hold the previous positive pulse during a number of zeros by looping the Q output of FF3 back to the D input of FF3. The present positive pulse will eventually be coupled to AND1 and positive BPV will be detected. If the present pulse is negative, then the feedback loop on FF3 is broken and a zero level pulse is coupled to the D input of FF3 and no BPV is detected. The negative BPV detection circuit consists of FF2, MUX2, FF4 and AND2, and functions exactly same as the positive BPV detection circuit. The output of OR gate OR2 is an active high positive/negative BPV signal which is coupled to FF5 and retimed by RLRCLK. The timing diagram of FIG. 5 illustrates the details of each signals where "B" denotes a bipolar pulse signal and "0" denotes a zero level signal and "V" denotes a violation pulse signal.

For subrates and 56 kbps rates

The DS0 cross-connect format between OCUs and multiplexing equipment is based on 8 bit bytes as follows: F1 D2 D3 D4 D5 D6 D7 C8

Bit F1 is used either for the subrate multiplexer framing code or for data in the case of 56 kbps service. Bits D2 through D7 are used for data in all services. Bit C8 is dedicated as the network control mode identifier. When bit C8 is a 1, bits D2 (or F1 for 56 kbps service) through D7 are identified as customer data. When bit C8 is a 0, bits D2 through D7 are interpreted as network control information. As described above, a baseband bipolar signal is used for transmission between OCUs and CSUs over local loops. When bit C8 is a 1, the normal bipolar rule applies, and the resultant line signal carries no bipolar violation pulse. When bit C8 is a 0, a bipolar violation encoding rule is applied, and the resultant line signal carries XOV bipolar violation sequence. The violation pulse V uniquely establishes the network control mode and also identifies the byte alignment. The system determined pulse X is set to force the number of B pulses between violations to be odd. This causes successive violations to alternate in sign, thus limiting dc build-up in the transmitted signal. Therefore, an XOV bipolar violation sequence which has opposite polarity as a preceding XOV bipolar violation sequence should not be interpreted as an error event. However, any BPV which does not have an XOV bipolar violation sequence should be interpreted as an error event. Any XOV bipolar violation sequence which has the same polarity as a preceding XOV bipolar violation sequence should also be interpreted as an error event. Thus, for these rates an LCV is the occurrence of a BPV which has the same polarity as the last BPV.

Figure 7:
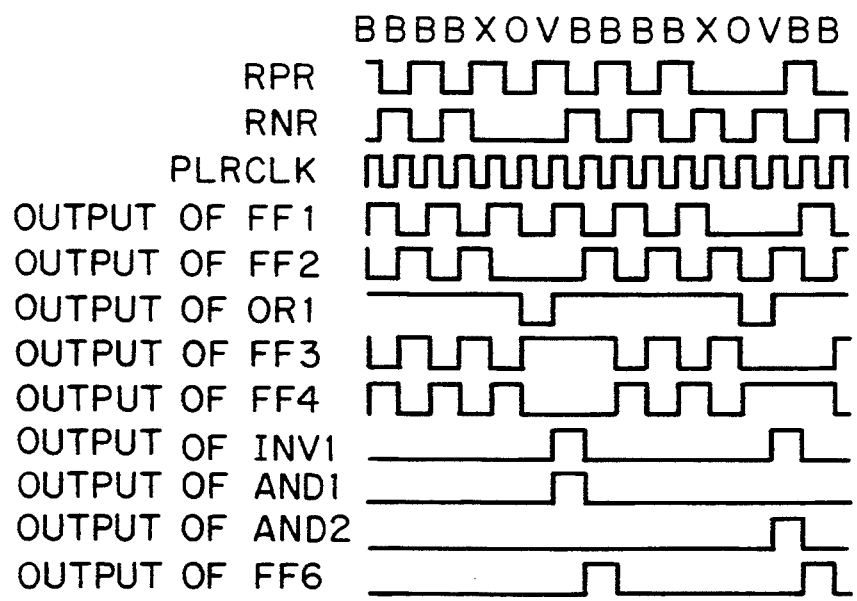
FIG. 7 is a timing diagram illustrating the details of each of the signals in FIG. 6.
Figure 6:
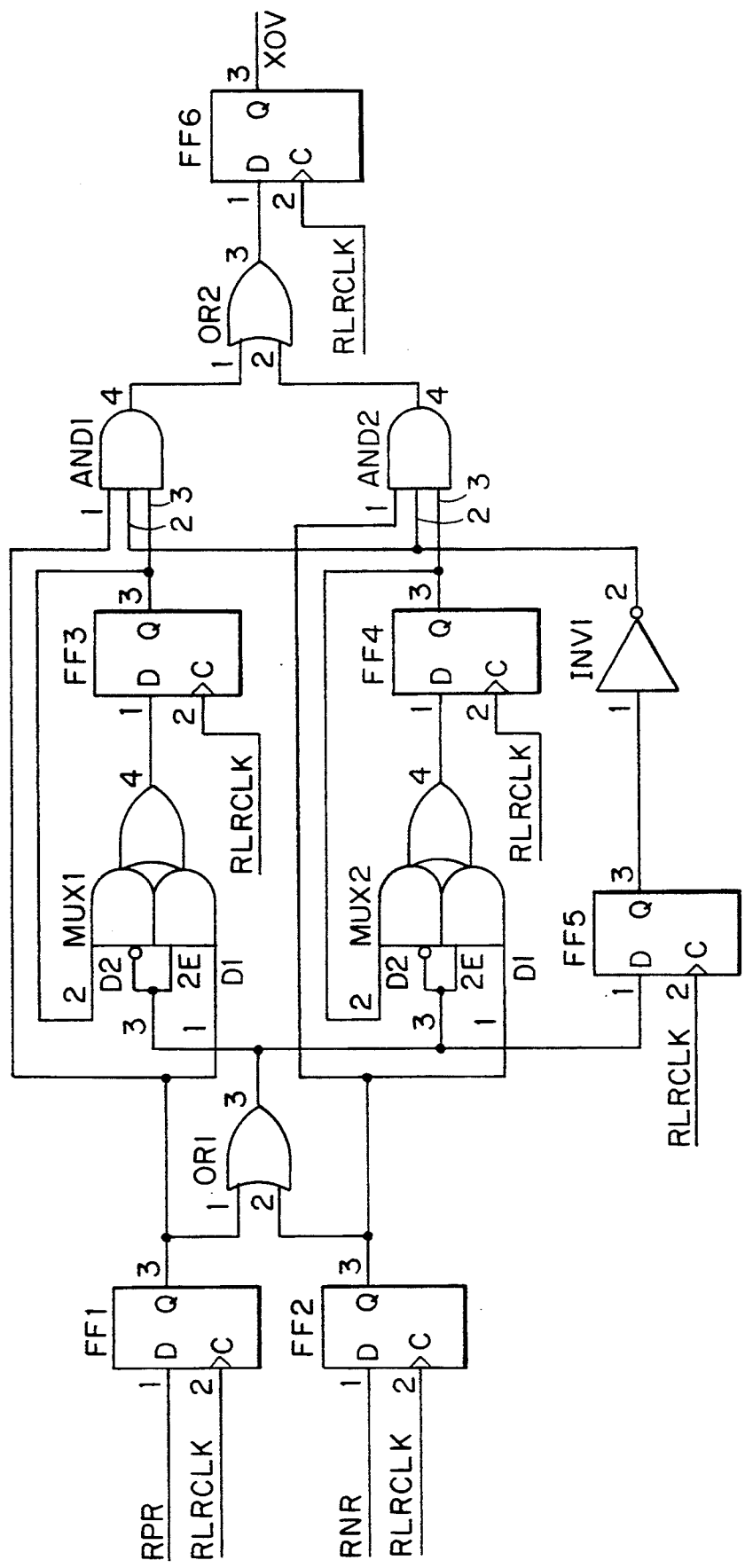
FIG. 6 is a schematic diagram of an XOV detection circuit.

The XOV detection circuit will now be described, in detail, in connection with FIG. 6. As shown in FIG. 6, the Receive Positive rail (RPR) pulses and the Receive Negative Rail (RNR) pulses are separately coupled to flip-flop circuits FF1 and FF2 where the two rails are retimed by clock pulses Receive Loop Rate Clock (RLRCLK). The Q output of FF1 is the present positive rail pulse and the Q output of FF3 is the previous positive rail pulse. The Q output of FF5 is the OR of the previous positive rail pulse and the previous negative rail pulse and is coupled to an inverter INV1. So, the output of INV1 becomes active high only when the previous pulse is a zero level pulse. These three outputs; FF1, FF3 and INV1, are coupled to an AND gate AND 1 where positive XOV is detected when the present positive rail pulse is a bipolar violation pulse and the previous pulse is a zero level pulse. Thus, the output of AND 1 is an active high positive XOV bipolar violation signal. The multiplexer MUX1 holds the previous positive pulse until the next pulse shows up. So, in the case of a number of zeros between two positive pulses, the MUX1 will hold the previous positive pulse during a number of zeros by looping the Q output of FF3 back to the D input of FF3. The negative XOV detection circuit consists of FF2, MUX2, FF4, FF5, INV1 and AND2, and functions exactly same as the positive XOV detection circuit. The output of OR gate OR2 is an active high positive/negative XOV signal which is coupled to FF6 and retimed by RLRCLK. The timing diagram of FIG. 7 illustrates the details of each signal in FIG. 6 where "B" denotes a bipolar pulse signal and "0" denotes a zero level signal and "V" denotes a violation pulse signal and "X" denotes a system-determined pulse signal that may be either a "0" or a "B".

Figure 8B:
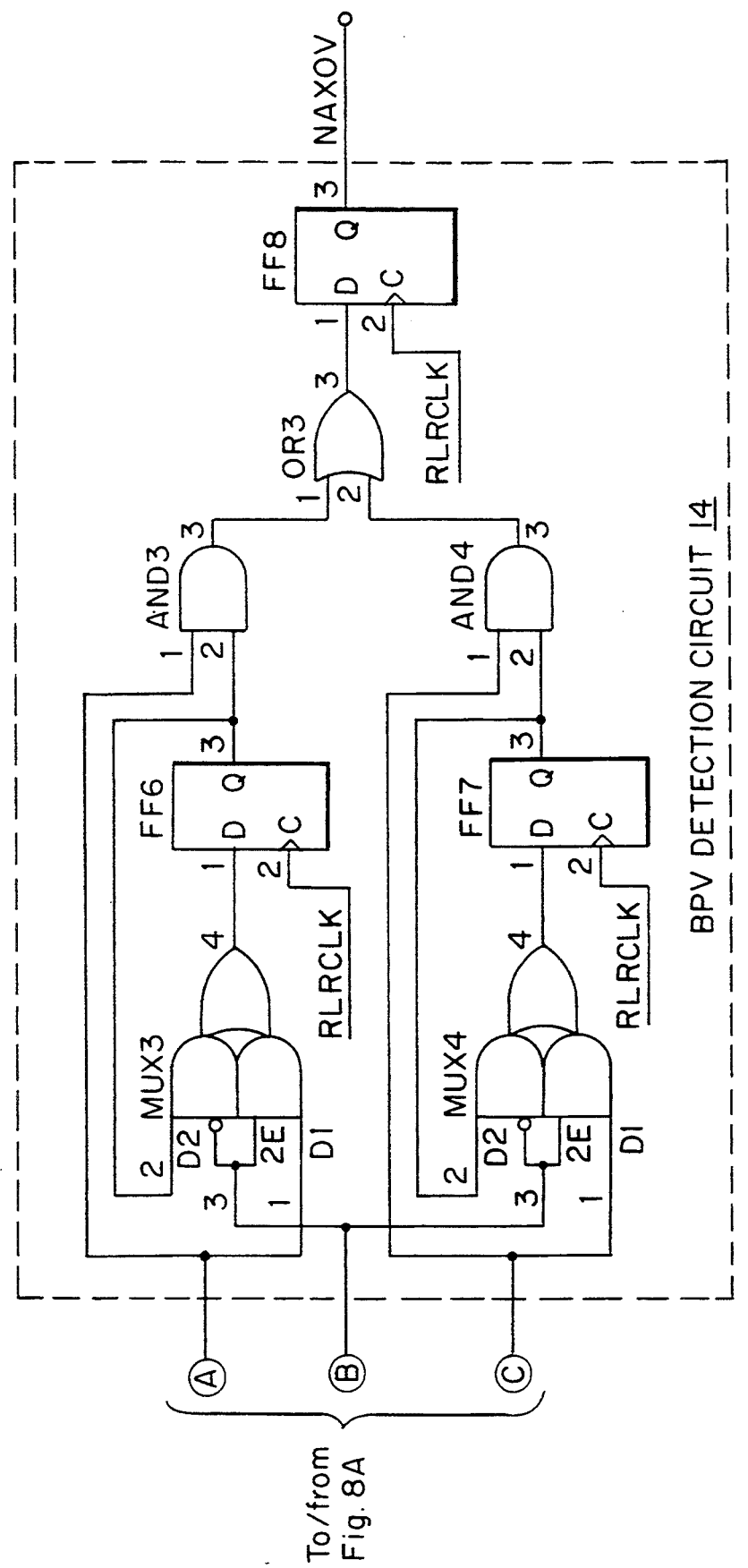
Figure 9:
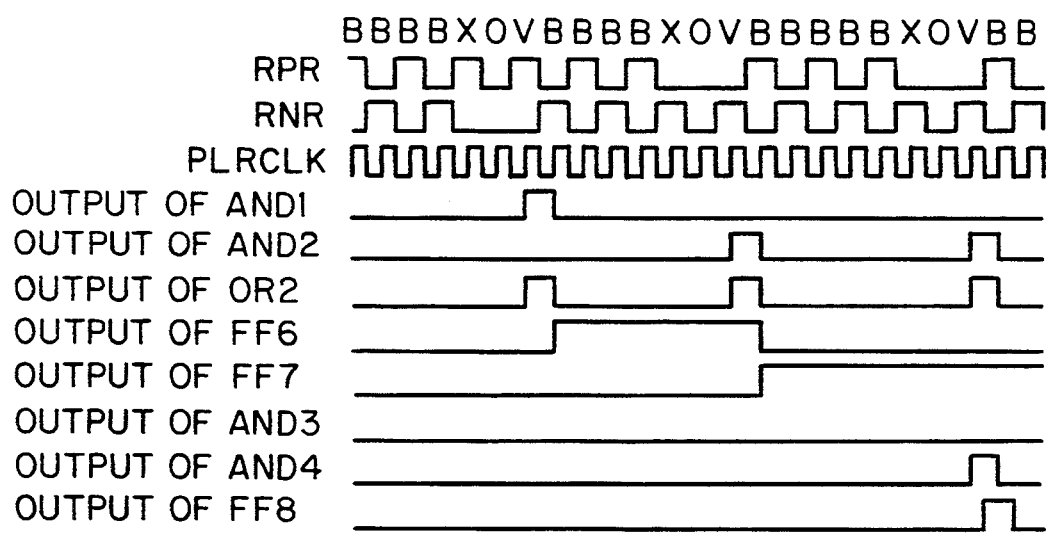
FIG. 9 is a timing-diagram illustrating the details of each of the signals in FIG. 8.

The non-alternating XOV detection circuit will now be described, in detail, in connection with FIGS. 8A and 8B. As shown in FIG. 8A and 8B, the non-alternating XOV detection circuit 18 consists of a XOV detection circuit 16 as a first stage and a BPV detection circuit 14 as a second stage. The first stage of XOV detection circuit detects either a positive XOV or a negative XOV. These two XOV detection signals from AND1 and AND2 are separately coupled to the second stage, BPV detection circuit 14. The output of AND1 is the present positive XOV pulse and the Q output of FF6 is the previous positive XOV pulse. These two positive XOV pulses are coupled to an AND gate AND3 where positive non-alternating XOV is detected when both of the present and previous positive XOV pulses are coupled at the same time. The multiplexer MUX3 holds the previous positive XOV pulse until the next XOV pulse shows up. So, the MUX3 will hold the previous positive XOV pulse during a number of zeros between two positive XOV pulses by looping the Q output of FF6 back to the D input of FF6. The present positive XOV pulse will be eventually coupled to AND 3 and positive non-alternating XOV will be detected. If the present XOV pulse is negative, then the feedback loop on FF6 is broken and a zero level pulse is coupled to the D input of FF6 and no non-alternating XOV is detected. The negative non-alternating XOV detection circuit functions exactly the same as the positive non-alternating XOV detection circuit. The output of OR3 is an active high positive/negative non-alternating XOV detection signal which is coupled to FF8 and retimed by RLRCLK. The timing diagram of FIG. 9 illustrates the details of each signal.

Performance Monitoring for MJU Circuits

As described above, in MJU networks, noisy station branches which are causing errors, interfere with a customer's active branch, thus possibly causing total multipoint network failure. In order to prevent a failed branch from interfering with the data transmission on an active branch, all network control codes (bit 8=0) received on any branch must be prevented from passing through to the control channel. The OCU that terminates a noisy station loop could transmit network control codes upstream upon detection of errors. This type of feature offering would achieve the error performance of two-point private line service on multipoint customer circuits where problems have occurred with noisy branches.

The OCU that has built-in LCV detection circuits will monitor the data received from the loop for streaming errors. When a streaming error condition is detected, the OCU will send an Abnormal Station Code (ASC) (S0011110) towards the network. The ASC is one of network control codes which have bit 8 equal to 0. The data bits (bits 1 to 7) of a received network control byte (bit 8=0) are first changed to all ones before further processing in MJU. The data bytes from the branches can then be ANDed so that zero bits will always pass through to the control channel. Therefore, the data bits of errored byte detected by the OCU will be converted to all ones, thus not interfering with active data signals. This feature inhibits data errors from corrupting an entire network and is desirable in MJU networks.

The metallic loop performance monitoring feature can be built in the OCU to monitor the metallic loop for LCVs. When too high an LCV rate is detected, the OCU will automatically idle out the DS0 channel by sending ASCs towards the network. While the OCU is in the idle state, it will continue to monitor the loop. When the loop performance returns to normal (acceptable BER), the loop monitoring circuitry automatically returns the OCU to an on-line state.

The loop performance monitoring circuitry will track errors in a unit of time and measure the unit of time asynchronously to the error events. The unit of time containing one or more error events is called an "errored second", and the unit of time containing no error event is called as an error free second. If eight or more errored seconds in any 64 second interval are detected, the loop performance monitoring circuitry will idle out the channel by sending ASCs towards the network. In other words, the metallic loop performance feature disables service when the error free seconds on the metallic loop drops below 87.5%. This off-line state will continue until 30 consecutive error free seconds are detected without the occurrence of an errors event. Then, 30 seconds after the loop performance monitoring circuitry begins receiving valid data from the metallic loop, it will return the OCU to an on-line state. The hysteresis assures that the OCU will only return on-line when the loop problem is solved. Similar other algorithms can be created based on the main ideas.

The loop performance monitoring is particularly valuable in multipoint configurations where streaming data on a single branch can effect service to customers connected to other branches of the multipoint network By automatically taking the noisy loop off-line when loop error are detected, the loop performance monitoring circuitry assures that other customers on the multipoint network will continue to receive high quality, reliable service, while the streaming branch is being repaired.

Proactive Maintenance with NIU

Figure 10:
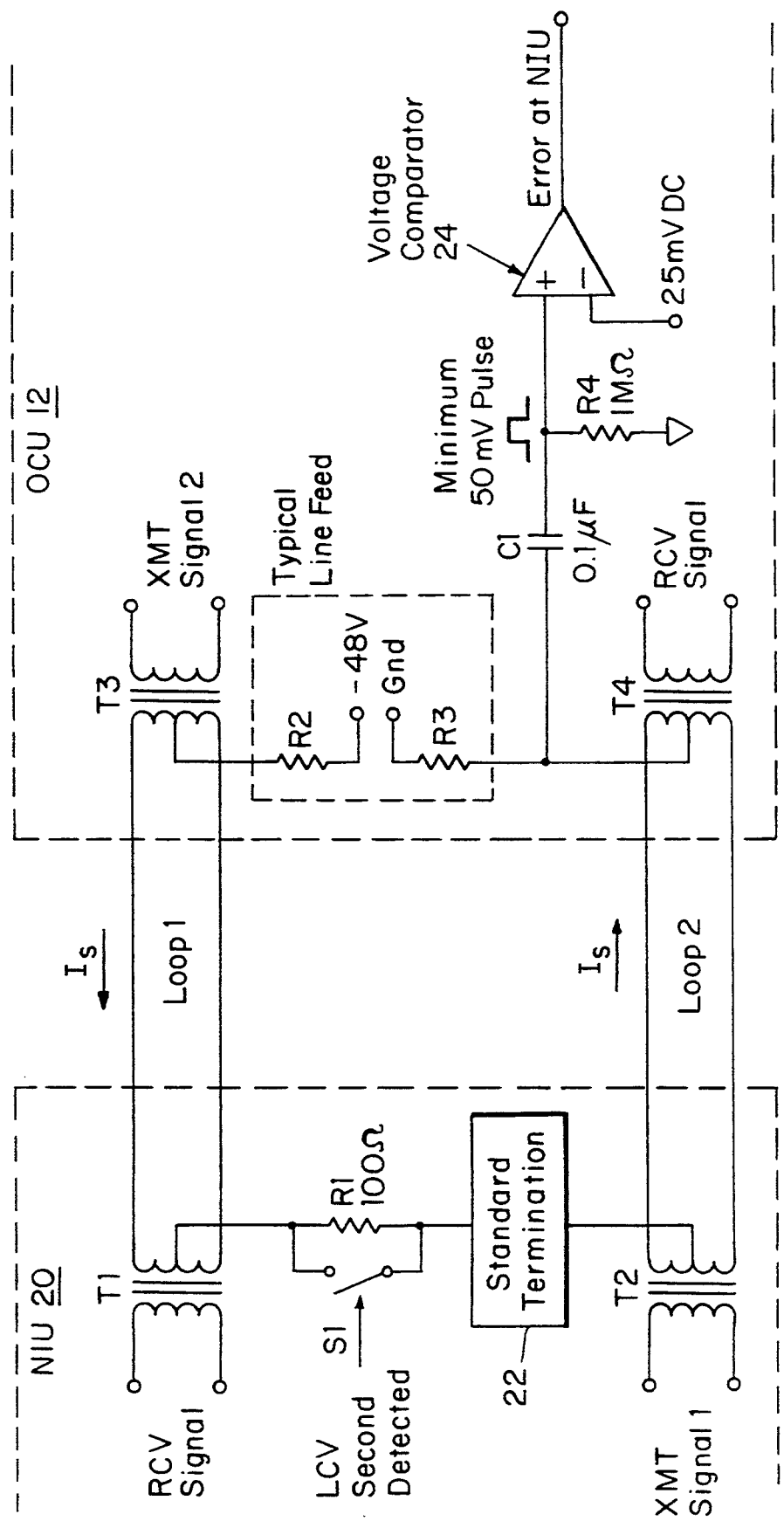
FIG. 10 is a schematic diagram of an NIU and OCU sealing current pulse detection circuit.

Referring now to FIG. 10, a DDS Smart Jack also called a DDS Network Interface Unit (NIU) 20 is a device which is installed at the customer-to-loop demarcation point which is called the Network Interface (NI). The NIU traditionally provides the telephone company with a test point to allow the sectionalization of troubles to either their network or the customer's premises. To provide proactive maintenance, the loop performance monitoring circuitry is added to the NIU. The NIU then monitors the incoming loop for LCVs in a manner analogous to the OCU as described earlier.

When the loop performance monitoring circuitry in the NIU 20 detects an "errored second" the NIU 20 sends information to the OCU over a slow speed data link using the 4-wire simplex path, shown in FIG. 10, as the communication channel. In DDS the sealing current is carried along this path.

As shown in FIG. 10, the 4-wire simplex data link consists of two-wire loops, loops 1 and 2, in which respective transmit signals 1 and 2 are coupled via input transformers T3 and T2, over loop lines 1 and 2 to receive transformers T1 and T4, respectively at the NIU 20 and OCU12.

In the OCU12, a sealing current circuit is provided in which current flows from an OCU to an NIU via center taps on the secondary windings of T3 and T4. The secondary of T4 is grounded through R4 and the center tap of the secondary of T3 is coupled through R2 to a typical line feed voltage of −48 volts.

The sealing current circuit path is completed in the NIU 20 by a standard terminator circuit 22 coupled between the center taps of T1 and T2.

A simple communication channel can be instrumented by pulsing the sealing current Is for 40 millisecond. As shown in FIG. 10, this pulse in the loop current may be generated by inserting an additional resistor R1 of 100 ohms into the current path at the NIU. Switch S1 is preferably a transistor switch which is triggered ON upon detection of an LCV "errored second". This pulse in the loop current is detected at the OCU through an AC coupled comparator circuit 24. The line feed resistors R2,R3 at the OCU are chosen such that the sealing current is not less than 4 mA. As a result, because of the 100 Ohms change in the sealing current path's resistance, when R1 is switched in, the 40 millisecond pulse has a magnitude of at least 400 mV, a good fraction of which is coupled through C1 to the comparator 24. The comparator 24 compares the received pulse to 25 mV DC and generates an output pulse which is recorded at the OCU as an indication of an "errored second" in the network-to-customer direction.

While the loop performance monitoring circuitry in the OCU can detect loop errors only in the customer-to-network direction, the XOV and BPV features described previously, allow the OCU to monitor the loop performance in the network-to-customer direction as well. The OCU collects and passes this information to a Proactive Maintenance Application circuit which uses it to declare loop alarms, both catastrophic, requiring immediate maintenance procedures and non-catastrophic (early warning), for which maintenance can be scheduled as convenient (but before the circuit experiences complete outage).

Without such an NIU, the monitoring of the loop performance in the network-to customer direction without a dispatch of personnel to the customer premises is not possible. By providing a loop performance monitoring capability at the demarcation between network and customer's premises the telephone company can identify troubles without dispatching personnel. This proactive maintenance feature will improve the overall reliability and quality of digital networks.

In summary, a system for Loop Performance Monitoring of DDS loops is described. Even though DDS loops have intentional Bipolar Violations (BPVs), a Loop Coding Violations (LCVs) detection system based on further processing of BPVs is described. By monitoring LCVs a local loop terminating device can determine Bit Error Rate (BER).

A system is described by which an OCU can process LCV information to determine signal quality of the signal over the incoming local loop. If the signal quality falls below a certain threshold, the OCU can cut the loop off from the DDS circuit and send control codes (ASC makes most sense but others can be used) into the network. When an OCU is part of a multipoint circuit, this strategy has obvious beneficial effects on the data transmission reliability of the circuit. Streaming branches no longer take down the whole circuit.

Finally, a system is described in which a Network Interface Unit with the Loop Performance Monitoring feature, communicates incoming LCV information to the OCU using slow speed signaling over the simplex path. The OCU monitors incoming LCVs as well, and thus has information necessary to develop bi-directional BER performance. It passes this information to a Proactive Maintenance Application (PMA) which instruments and appropriate strategy to provide to the end user, a desired grade of service pertaining to loop reliability.

Equivalents

Those skilled in the art will recognize, or be able to ascertain using no more than routine experimentation, many equivalents to specific embodiments of the invention described specifically herein. Such equivalents are intended to be encompassed in the scope of the following claims.

The invention claimed is:

1. Apparatus for coupling to a communication channel of a local loop circuit in which information is transmitted as a stream of digital bits comprising:
    a) an LCV circuit for determining the occurrence of loop code violations, in which a loop code violation comprises the occurrence of an unintentional bipolar violation as distinguished from an intentional bipolar violation; and an intentional bipolar violation is signalled by an XOV bipolar violation sequence in which a violation bit V, having the same polarity as a previous bit, is intentionally inserted into the bit stream preceded by intentional insertion of an X bit two bits prior to the violation which may comprise a bit having a polarity or no polarity such that successive violations alternate in polarity and intentional insertion of a zero value bit between the X and V bits; and
    b) disabling means for disabling the communication channel when the frequency of occurrence of loop code violations exceeds a predetermined rate.

2. The apparatus of claim 1 wherein, if the number of bits since the occurrence of the last violation bit V is an even number, a bit of opposite polarity to the previous bit is inserted as the X bit and in the event the number of bits since the occurrence of the last violation bit V is an odd number, the inserted X bit is a ZERO.

3. The apparatus of claim 1 including enabling means for enabling the communication channel when the frequency of occurrence of loop code violations returns to a predetermined acceptable rate.

4. The apparatus of claim 1 in which the communication channel is disabled by transmitting an abnormal status code.

5. Apparatus for coupling to a communication channel in which information is encoded as a pulse stream of alternate mark inversion bipolar pulses comprising:
 a) a code violation circuit for determining the occurrence of an unintentional bipolar sequence violation as distinguished from an intentional bipolar sequence violation wherein an intentional bipolar violation is signalled by an XOV bipolar violation sequence in which a violation pulse V having the same polarity as a previous pulse is inserted into the pulse stream and is preceded by insertion of an X pulse two pulses prior to the V pulse which may have a polarity or no polarity such that successive violation pulses alternate in polarity and insertion of a zero value pulse between the X and V pulses; and
 b) disabling means for disabling the communication channel when the rate of occurrence of said unintentional violations exceeds a predetermined number.

6. The apparatus of claim 5 wherein an unintentional bipolar violation is determined by detecting a bipolar violation which does not have an XOV bipolar violation sequence or an XOV bipolar violation sequence which has the same polarity as a preceding XOV bipolar violation sequence.

7. The apparatus of claim 1 in which the digital bits are encoded as alternate-mark-inversion bipolar pulses and transmitted on each of two rails of a transmit loop wherein one rail is a positive rail and the other is a negative rail which carries the inverse of the pulses on the other rail and wherein a bipolar violation occurs when a present pulse on one rail has the same polarity as a previous pulse on the same rail, and including a bipolar violation detection circuit comprising:
 a) a first circuit for receiving the present pulses and outputting the present pulses from one rail;
 b) a second circuit for storing the present pulses and outputting the present pulses delayed by one pulse interval, such that the outputs of the second circuit are the previous pulses;
 c) a third circuit for determining the presence of pulses from the first and second circuit of the same polarity and indicating a bipolar violation upon such occurrence.

8. A loop performance monitor for detecting the occurrence of unintentional bipolar violations in which digital signals are encoded as alternate-mark-inversion bipolar pulses and transmitted on each of two rails of a transmit loop wherein one rail is a positive rail and the other is a negative rail which carries the inverse of the pulses on the other rail and wherein a bipolar violation occurs when a present pulse on one rail has the same polarity as a previous pulse on the same rail, and wherein intentional bipolar violations are indicated by an XOV series of pulses, said monitor comprising:
 a) a first circuit for receiving the present pulses and outputting the present pulses from one rail;
 b) a second circuit for storing the present pulses and outputting the present pulses delayed by one pulse interval, such that the outputs of the second circuit are the previous pulses;
 c) a third circuit for determining the presence of pulses from the first and second circuit of the same polarity and indicating a bipolar violation upon such occurrence in the event an XOV series of pulses is not present.

9. A communication system for transmitting a signal indicating the reception of loop code violations to a transmitter comprising:
 a) a first communication loop comprising a first two wire circuit in which communication signals are transmitted from a first transmitter at a first terminal to a first receiver at a second terminal in a first direction by inductively coupling transmit signals to the first circuit and inductively coupling received signals from the first circuit;
 b) a second communication loop comprising a second two wire circuit in which communication signals are transmitted from a second transmitter at said second terminal to a second receiver at said first terminal in a second direction by inductively coupling transmit signals to the second circuit and inductively coupling received signals from the second circuit;
 c) a direct current path running from the first circuit to the second circuit;
 d) a direct circuit power source coupled across the direct current path at the first terminal;
 e) a switch in the direct current path at the second terminal generating a current pulse indicating the reception of loop code violations; and
 f) a detector coupled to the direct current path at the first terminal for detecting the occurrence of the pulse.

10. The system of claim 9 wherein the inductive coupling is provided by a pair of transformers at each terminal, each transformer having primary and secondary windings and the direct current path is completed through taps on said windings.

11. The system of claim 10 in which the pulse is formed by inserting an impedance into the direct current path.

12. The system of claim 10 in which the pulse is detected by a voltage comparator circuit.

13. A method of communication in which information is transmitted as a stream of digital bits comprising the steps of:
 a) determining the occurrence of loop code violations, wherein a loop code violation comprises the occurrence of an unintentional bipolar violation as distinguished from an intentional bipolar violations and wherein an intentional bipolar violation is signalled by an XOV bipolar violation sequence in which a violation bit V, having the same polarity as a previous bit, is intentionally inserted into the bit stream preceded by intentional insertion of an X bit two bits prior to the violation which may comprise a bit having a polarity or not polarity such that successive violations alternate in polarity and intentional insertion of a zero value bit between the X and V bits; and
 b) disabling the communication when the frequency of occurrence of loop code violations exceeds a predetermined rate.

14. The method of claim 13 wherein, if the number of bits since the occurrence of the last violation bit V is an even number, a bit of opposite polarity to the previous bit is inserted as the X bit and in the event the number of bits since the occurrence of the last violation bit V is an odd number, the inserted X bit is a ZERO.

15. The method of claim 13 including the step of enabling the communication channel when the frequency of occurrence of loop code violations returns to a predetermined acceptable rate.

16. The method of claim 13 in which the communication channel is disabled by transmitting an abnormal status code.

17. A method of communication in which information is encoded as a pulse stream of alternate mark inversion bipolar pulses comprising the steps of:
 a) determining the occurrence of an unintentional bipolar sequence violation as distinguished from an international bipolar sequence violation, wherein an intentional bipolar violation is signalled by an XOV bipolar violation sequence in which a violation pulse V having the same polarity as a previous pulse is inserted into the pulse stream and is preceded by insertion of an X pulse two pulses prior to the V pulse which may have a polarity or no polarity such that successive violation pulses alternate in polarity and intentional insertion of a zero value pulse between the X and V pulses; and
 b) disabling communication when the rate of said unintentional violations exceeds a predetermined number.

18. The method of claim 17 wherein an unintentional bipolar violation is determined by detecting a bipolar violation which does not have an XOV bipolar violation sequence or an XOV bipolar violation sequence which has the same polarity as a preceding XOV bipolar violation sequence.

19. The method of claim 18 in which the digital bits are encoded as alternate-mark-inversion bipolar pulses and transmitted on each of two rails of a transmit loop wherein one rail is a positive rail and the other is a negative rail which carries the inverse of the pulses on the other rail and wherein a bipolar violation occurs when a present pulse on one rail has the same polarity as a previous pulse on the same rail, and including the steps of:
 a) receiving the present pulses and outputting the present pulses from one rail;
 b) storing the present pulses and outputting the present pulses delayed by one pulse interval, such that the outputs of the second circuit are the previous pulses;
 c) determining the presence of pulses from the first and second circuit of the same polarity and indicating a bipolar violation upon such occurrence.

20. A method for transmitting a signal indicating the reception of loop code violations to a transmitter comprising the steps of:
 a) communicating signals from a first transmitter at a first terminal to a first receiver at a second terminal in a first direction by inductively coupling transmit signals to a first circuit and inductively coupling received signals from the first circuit;
 b) communicating signals from a second transmitter at said second terminal to a second receiver at said first terminal in a second direction by inductively coupling transmit signals to a second circuit and inductively coupling received signals from the second circuit;
 c) generating a direct current pulse indicating an loop code violation in a current path formed through the first and second circuits; and
 d) detecting the occurrence of the pulse.

* * * * *

UNITED STATES PATENT AND TRADEMARK OFFICE
CERTIFICATE OF CORRECTION

PATENT NO. : 5,394,145
DATED : February 28, 1995
INVENTOR(S) : Dev V. Gupta and Kyung-Yeop Hong It is certified that error appears in the above-indentified patent and that said Letters Patent is hereby corrected as shown below:

Col. 12, line 23, change "circuit" to ---current---.

Signed and Sealed this

Sixth Day of June, 1995

Attest:

BRUCE LEHMAN

Attesting Officer

Commissioner of Patents and Trademarks